United States Patent [19]

Romano

[11] 4,024,763

[45] May 24, 1977

[54] CUMULATIVE CALORIMETER

[76] Inventor: Ronald R. Romano, 19834 Riverside Drive, Jupiter, Fla. 33458

[22] Filed: Apr. 26, 1976

[21] Appl. No.: 680,119

[52] U.S. Cl. .............................. 73/339 R; 128/2 H
[51] Int. Cl.² ......................................... G01K 3/04
[58] Field of Search ........... 73/15 R, 190 R, 193 R, 73/339 R; 128/2 H

[56] References Cited

UNITED STATES PATENTS

| | | | |
|---|---|---|---|
| 2,315,779 | 4/1943 | Ford | 73/363.9 |
| 2,320,311 | 5/1943 | Myers | 73/339 |
| 3,096,434 | 7/1963 | King | 73/205 |
| 3,110,179 | 11/1963 | Kooiman | 73/193 |
| 3,237,448 | 3/1966 | Howell et al. | 73/116 |
| 3,417,616 | 12/1968 | Smith | 73/339 |
| 3,460,389 | 8/1969 | Lamb | 73/363.7 |
| 3,960,138 | 6/1976 | Doss et al. | 128/2 |

Primary Examiner—Herbert Goldstein
Attorney, Agent, or Firm—Oltman and Flynn

[57] ABSTRACT

This cumulative calorimeter has a clockwork whose speed is controlled in accordance with detected temperature changes, for example, through a bimetal strip which senses heat applied to a conductive disc. An adjusting screw mounts the bimetal strip on the disc for initially adjusting the clockwork speed. The clockwork may be mechanical or it may be electronic and located away from the temperature sensing part of the device.

5 Claims, 4 Drawing Figures

CUMULATIVE CALORIMETER

BACKGROUND OF THE INVENTION

Various time-temperature integrators have been proposed heretofore, for example, the integrator shown in U.S. Pat. No. 2,320,810 to Stoddard et al and in Myers U.S. Pat. No. 2,320,811, and the devices shown in Perry U.S. Pat. No. 3,392,584, Lever et al U.S. Pat. No. 3,186,228, and Cotton U.S. Pat No. 2,758,474. In general, such prior devices are relatively bulky relatively complicated and not adapted to be worn conveniently on the human body for the purpose of registering a person's expenditure of calories over a selected time interval.

SUMMARY OF THE INVENTION

The present invention is directed to a novel device for integrating over a period of time the temperature of a body under test, particularly the body of a human person to determine his or her expenditure of calories over the selected time period.

A principal object of this invention is to provide such a devce which is adapted to be applied to a person's body, such as on the wrist, to determine how many calories the person burns up in a given time period, such as 24 hours.

Another object of this invention is to provide such a device which is initially adjustable in accordance with characteristics of the person whose caloric expenditure is to be measured.

Another object of this invention is to provide such a device containing a clockwork whose speed is varied in accordance with the temperature of the body being tested, so that the final reading of the clockwork's pointer indicates the cumulative heat output of that body over a selected period of time.

Further objects and advantages of this invention will be apparent from the following detailed description of presently-preferred embodiments thereof, which are shown in the accompanying drawing, in which.

Before explaining the disclosed embodiment of the present invention in detail, it is to be understood that the invention is not limited in its application to the details of the particular arrangement shown, since the invention is capable of other embodiments. Also, the terminology used herein is for the puprpose of description and not of limitation.

Figure 1:
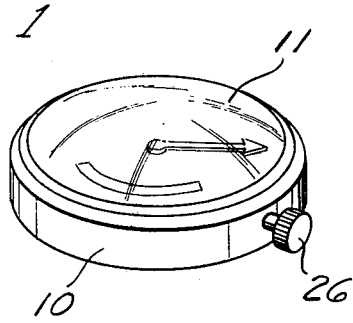
FIG. 1 is a perspective view of a self-contained device in accordance with a presently-preferred embodiment of this invention.

Referring first to FIG. 1, the preferred embodiment of the present device has an annular casing 10 of heat insulation material and a transparent top comver 11 sealed to the casing in fluid-tight fashion.

Figure 2:
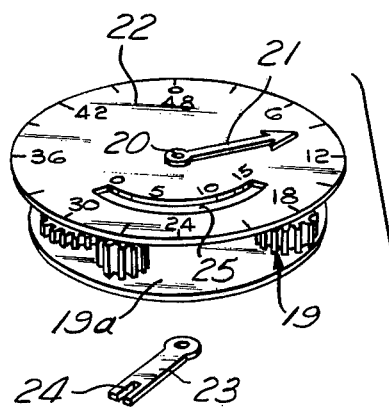
FIG. 2 is an exploded perspective view showing the operating parts of this device.
Figure 3:
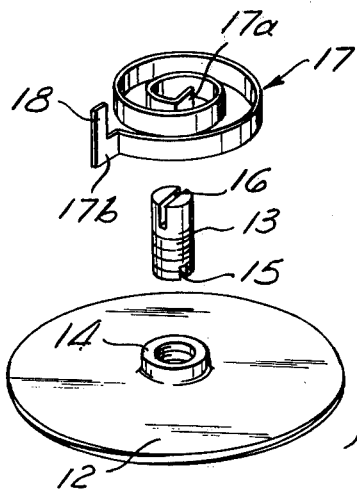
FIG. 3 is a fragmentary perspective view showing the coupling between the temperature-sensitive strip and the speed adjustment arm for the clockwork mechanism.
Figure 3:
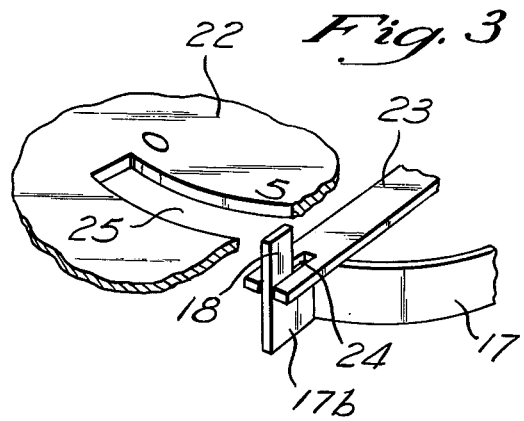

On the bottom the casing 10 carries a circular disc 12 (FIG. 2) of high conductivity metal, such as copper, which loses the bottom of the casing. This disc preferably is screw-threadedly mounted in the casing. It presents a flat bottom face which is exposed to the body or object whose temeprature is to be measured, such as a human body.

Figure 4:
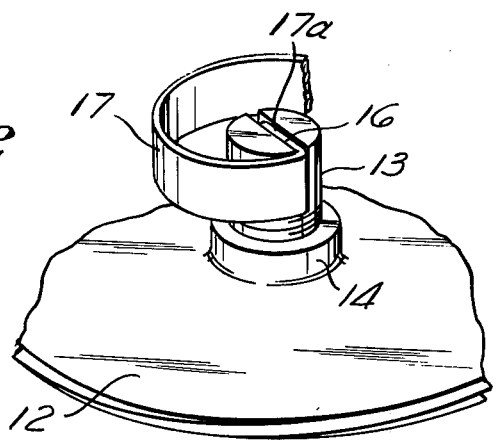
FIG. 4 is a fragmentary perspective view showing the mounted inner end of the temperature-sensitive strip.

An adjusting screw 13 of copper or other high conductivity metal is screw-threadedly mounted centrally on the conductive disc 12, such as in a threaded boss 14 projecting up from the disc, as shown in FIG. 4. The adjusting screw is in metal-to-metal contact with the disc for maximum conductivity of heat from the disc to the screw. The screw 13 has a screw driver slot 15 on the bottom (FIG. 2) which is readlily accessible from below the disc 12 when the adjusting screw is mounted on it. The screw 13 also has a transverse slot 16 in its upper end.

A heat sensitive strip 17 is anchored at one end in the slot 16 in the adjusting screw 13, as best seen in FIG. 4. In the particular example shown this heat sensitive strip 17 is a sprirally wound bimetal strip having an inturned, transverse inner end 17a tightly received in the slot 16, so that there is metal-to-metal contact between the adjusting screw and the strip for efficient heat conduction from the disc 12 to the inner end of strip 17 through the adjusting screw 13. The heat sensitive strip 17 extends through two or more spiral convolutions from its mounted inner end 17a to an out-turned, transverse outer end 17b (FIG. 2), which has an upwardly projecting finger 18. It will be understood that the bimetal strip 17 expands or contracts with temperature changes so that the finger 18 on its outer end is displaced arcuately about the adjusting screws 13 as a center in accordance with the temperature of the disc 12.

A clockwork mechanism 19 of known design is mounted inside the casing 11 immediately above the heat-sensitive strip 17. This clockwork has a centrally positioned output shaft 20 to which a radially extending pointer 21 is connected at its inner end. This pointer overlies a face plate 22 which is calibrated around its circular periphery.

The clockwork has an adjusting arm 23 for controlling the speed at which it runs, for example, from the fastest speed, in which the pointer 21 turns through 360° in a 24-hour interval, to the slowest speed, in which the pointer turns only 72° in a 24-hour interval. The clockwork-adjusting arm 23 extends immediately below the base 19a of the clockwork and has its inner end coupled below the base 19a of the clockwork to control the latter's speed in a known manner. The outer end of the adjusting arm 23 has a radial slot 24 which is located just beyond the edge of the base 19a of the clockwork and snugly receives the upwardly projecting finger 18 on the outer end of the heat sensitive strip 17.

The face plate 22 has an arcuate slot 25 located immediately above the upwardly projecting finger 18 on the outer end of the heat sensitive strip 17. A series of calibrations from zero to 15 extend along the arcuate slot 25.

It will be seen that the angular rotational position of the adjusting arm 23 for the clockwork mechanism 19 (and therefore the speed at which the clockwork runs) is determined by the arcuate position of the free end of the heat sensitive strip 17. At any given temperature, the position of the clockwork adjusting arm 23 can be adjusted by using a screw-driver to turn the adjusting screw 13, thereby turning the inner end of the heat sensitive strip 17 and imparting a corresponding angular displacement to the outer end of this strip.

In one practical embodiment the circular series of calibrations along the periphery of the face plate 22 has 48 equal gradations, each increment representing an expenditure of 100 calories by the human being whose caloric output is being measured by the instrument. Further subdivisions representing 25 calories each may be provided on the calibrated periphery of the face plate.

A reset knob 26 (FIG. 1) is coupled to the clockwork 19 in a known manner so that the pointer 21 can be reset to zero whenever desired.

In the use of this device, the adjusting screw 13 for the heat sensitive strip 17 is turned to position the finger 18 on the outer end of this strip at a numbered setting along the arcuate slot 25 in the face plate 22 which is determined by the height, weight, age and sex of the person whose caloric expenditure is to be measured. This numbered setting should be made after the device had been applied to the user's wrist in the same fashion as a wrist watch and the user has remained at rest for a long enough interval of time to bring his or her body temperature down to normal.

If the user were to remain at rest, then his or her body temperature would remain at this level and the clockwork 19 would run at a substantially constant speed determined by this initial section of the outer end of the strip 17 along the arcuate slot 25 in the face plate.

However, when the user becomes active his or her body temperature will increase, more or less in proportion to the degree of activity. This will be sensed by the conductive disc 12 and the heat sensitive strip 17 will move its outer end arcuately in accordance with this temperature change, thereby changing the angular position of the adjusting arm 23 by the same amount and causing the clockwork 19 to run faster.

At the end of an appropriate time interval, such as 24 hours, the angular displacement of the pointer 21 from its original zero position will tell the user's total caloric expenditure of body heat during that interval.

The minimum speed setting of the clockwork (72° in 24 hours), as determined by the angular position of the adjusting arm 23, would correspond to the caloric expenditure of an old, small person lying in bed for the full 24 hours. The maximum speed setting of the clockwork (360° in 24 hours) would correspond to the caloric expenditure of a manual laborer doing hard physical work for 8 hours, normal activities for 8 hours and sleep for 8 hours. Obviously, the caloric expenditure of almost any person to be tested would fall between these extremes.

It is to be understood that the clockwork 19 may be powered by a spring or by a battery or other power source.

Also the heat sensitive strip 17 may be a normally straight (instead of coiled) bimetal strip, if desired.

It is to be understood that the present appparatus may be used for purposes other than measuring the caloric expenditure of a person over a period of time. For example, it may be used to measure the heat given off by an air conditioner, heat pump or other machine, or it may be used in an oven, or it may be applied to insulation to determine the heat gain or loss through it.

I claim:

1. In an apparatus having
a casing,
a calibrated face plate on one side of said casing for viewing,
a pointer overlying said calibrated face plate,
a metal disc of high heat conductivity mounted on the oppoostie side of said casing to be exposed directly to a source of heat,
and a heat sensitive strip anchored at one end and having an opposite free end carrying a segment which is movable with temperature changes, said strip being conductively coupled to said disc so that the position of said movable segment corresponds to the temperature of said disc, said strip being positioned inside the casing between said disc and said calibrated face plate,
the improvement which comprises:
a clockwork positioned inside said casing between said strip and said calibrated face plate and driving said pointer;
means operatively coupling said movable segment of the heat sensitive strip to said clockwork to regulate the latter's speed in accordance with the temperature of said disc;
and means providing an arcuate slot in said calibrated face plate which registers with said movable segment of the heat sensitive strip.

2. An apparatus according to claim 1, wherein said face plate has calibrations along said arcuate slot.

3. Apparatus according to claim 2, and further comprising an adjusting screw threadedly mounted in said disc and having its inner end connected to said one end of the strip for adjusting the strip when the screw is turned in the disc.

4. In a cumulative calorimeter having an annular casing,
a transparent top cover on said casing,
a disc of high conductivity material on the bottom of said casing for exposure to a source of heat,
and a heat sensitive, spirally wound strip inside said casing directly above said disc and having its inner end anchored conductively to said disc and having a movable opposite free end whose position varies arcuately with the temperature,
an improvement which comprises:
a clockwork inside said casing above said strip and operatively coupled to the free end of the strip to run at a speed proportional to position of said free end of the strip.
an adjusting screw in metal-to-metal, screw-threaded engagement with said disc, said adjusting screw having a slot in its inner end which snugly receives the inner end of the strip to anchor the latter conductively to the disc and having a screw driver slot in its outer end;
and a visual indicator inside said casing above said clockwork and below said transparent top cover, said indicator being operatively coupled to the output of said clockwork to designate the latter's cumulative output as a measure of the heat sensed by said disc over a period of time.

5. In a cumulative calorimeter having an annular casing,
a transparent top cover on said casing,
a side of high conductivity material on the bottom of said casing for exposure to a source of heat,
and a heat sensitive strip inside said casing directly above said disc and having one end thereof anchored conductively to said disc and having a movable opposite free end whose position varies arcuately with the temperature,
the improvemnt which comprises:

a clockwork inside casing above said strip and operatively coupled to the free end of the strip to run at a speed proportional to position of said free end of the strip;

a calibrated face plate inside casing above said clockwork and below said top cover, said face plate having an arcuate slot which registers with said free end of the strip, said face plate having a series of calibrations along said arcuate slot and having another series of calibrations along its periphery;

and a pointer driven by said clockwork and movable along said last-mentioned series of calibrations to designate the cumulative output of the clockwork as a measure of the heat sensed by said disc over a period of time.

6. A calorimeter according to claim 5, wherein said strip is spirally wound, and further comprising a conductive adjusting screw which is screw-threadedly mounted in said disc and has a slotted inner end which snugly received said inner end of said strip to anchor the latter conductively to the disc.

7. A calorimeter according to claim 6, wherein said disc is screw-threaded into the bottom of said casing.

* * * * *